(12) United States Patent
King et al.

(10) Patent No.: US 7,210,270 B1
(45) Date of Patent: May 1, 2007

(54) PARTITION SYSTEM WITH ELEVATED RACEWAY

(75) Inventors: Jonathan J. King, East Grand Rapids, MI (US); Joel T. Ruiter, Grand Haven, MI (US); David J. Dekker, Holland, MI (US); James D. Houda, Grand Rapids, MI (US)

(73) Assignee: Steelcase Development Corporation, Caledonia, MI (US)

( * ) Notice: Subject to any disclaimer, the term of this patent is extended or adjusted under 35 U.S.C. 154(b) by 214 days.

(21) Appl. No.: 09/692,663

(22) Filed: Oct. 20, 2000

(51) Int. Cl.
*E04H 1/00* (2006.01)

(52) U.S. Cl. .......................... 52/239; 52/220.7; 52/36.1

(58) Field of Classification Search ............... 52/238.1, 52/243, 243.1, 220.1, 220.7, 239, 481.2, 52/241, 242, 36.1; 312/223.6, 198; 160/135, 160/40, 351; 211/189; 40/649, 653, 654, 40/765, 490, 491, 611.06, 611.08; 248/201, 248/68.1, 49, 74.1, 74.2, 74.3, 74.4; 24/66.4, 24/253, 457, 459, 545, 570
See application file for complete search history.

(56) References Cited

U.S. PATENT DOCUMENTS

| | | | | |
|---|---|---|---|---|
| 758,088 A * | 4/1904 | Mixer | ........................ | 40/649 |
| 1,887,894 A * | 11/1932 | Scwab | ........................ | 40/130 |
| 2,049,855 A * | 8/1936 | Meyer | ........................ | 40/130 |
| 2,125,747 A * | 8/1938 | Zadek | ........................ | 40/130 |
| 2,752,709 A * | 7/1956 | Gough | ........................ | 40/130 |
| 3,719,000 A * | 3/1973 | Finger | ........................ | 40/130 |
| 3,817,396 A * | 6/1974 | Markson | ........................ | 40/130 |
| 4,030,219 A * | 6/1977 | Donovan | ........................ | 40/130 |
| 4,094,561 A * | 6/1978 | Wolff et al. | ................ | 312/223 |
| 4,119,285 A * | 10/1978 | Bisping et al. | ............... | 248/72 |
| 4,716,698 A | 1/1988 | Wilson et al. | | |
| 4,738,040 A * | 4/1988 | Neuhold et al. | ............... | 40/152 |
| 4,951,906 A * | 8/1990 | Morey | ........................ | 40/130 |
| 5,209,035 A | 5/1993 | Hodges et al. | | |
| 5,271,585 A | 12/1993 | Zetena, Jr. | | |
| 5,277,007 A | 1/1994 | Hellwig et al. | | |
| 5,316,244 A | 5/1994 | Zetena, Jr. | | |
| 5,362,923 A | 11/1994 | Newhouse et al. | | |
| 5,393,021 A * | 2/1995 | Nelson | ........................ | 248/71 |
| 5,487,246 A * | 1/1996 | Hodges et al. | ............. | 52/220.7 |
| 5,606,919 A * | 3/1997 | Fox et al. | ..................... | 108/50 |

(Continued)

FOREIGN PATENT DOCUMENTS

WO        WO0021412        10/1999

*Primary Examiner*—Daniel P. Stodola
*Assistant Examiner*—Nahid Amiri
(74) *Attorney, Agent, or Firm*—Price, Heneveld, Cooper, DeWitt & Litton, LLP (57) ABSTRACT

An elevated raceway for routing utility lines in a vertically spaced relationship above the upper edge of a partition. The raceway includes an elongated passageway configured to retain utility lines in a horizontally extending manner. A first support member extends downwardly from the raceway, and has a connector spaced apart from the raceway a first vertical distance. The connector is configured to attach to a partition frame. A second support member extends downwardly from the raceway, and has a connector spaced apart from the raceway a second vertical distance that is different from the first vertical distance, such that the raceway is supported at a generally uniform vertical height above an upper edge of a partition having sections with different heights.

28 Claims, 8 Drawing Sheets

U.S. PATENT DOCUMENTS

| | | | |
|---|---|---|---|
| 5,626,926 A * | 5/1997 | Roberts | 40/130 |
| 5,675,949 A * | 10/1997 | Forslund et al. | 52/220.7 |
| 5,743,052 A | 4/1998 | Mayhall et al. | |
| 5,831,211 A | 11/1998 | Gartung et al. | |
| 5,986,212 A | 11/1999 | Lhota | |
| 6,003,255 A * | 12/1999 | Mahoney et al. | 40/130 |
| 6,023,896 A * | 2/2000 | Rothschild | 52/243.1 |
| 6,079,173 A * | 6/2000 | Waalkes et al. | 52/239 |
| 6,101,773 A * | 8/2000 | Chau et al. | 52/220.7 |
| 6,161,347 A | 12/2000 | Yu et al. | |
| 6,178,702 B1 * | 1/2001 | Hand et al. | 52/36.6 |
| 6,253,509 B1 * | 7/2001 | Hellwig et al. | 52/239 |
| 6,330,773 B1 | 12/2001 | MacDonald et al. | |
| 6,341,457 B1 * | 1/2002 | Aerts et al. | 52/239 |
| 6,349,516 B1 * | 2/2002 | Powell et al. | 52/239 |
| 6,363,663 B1 * | 4/2002 | Kane et al. | 52/36.6 |
| 6,453,826 B1 * | 9/2002 | Fookes et al. | 108/50.11 |
| 6,622,976 B1 * | 9/2003 | Ianello | 248/73 |
| 6,648,280 B1 * | 11/2003 | Chong | 248/68.1 |
| 6,817,147 B1 * | 11/2004 | MacDonald | 52/220.7 |
| 2002/0069601 A1 * | 6/2002 | Hodges et al. | |
| 2002/0189180 A1 * | 12/2002 | King et al. | 52/243 |

* cited by examiner

PARTITION SYSTEM WITH ELEVATED RACEWAY

BACKGROUND OF THE INVENTION

Modern offices are becoming increasingly complicated and sophisticated due largely to the ever increasing needs of the users for improved utilities support at each workstation, such as communications, computers and other types of data processors, electronic displays, etc., including physical accommodations, such as lighting, HVAC, security, and the like. For example, modern offices for highly skilled "knowledge workers" such as engineers, accountants, stock brokers, computer programmers, etc., are typically provided with multiple pieces of very specialized computer and communications equipment that are capable of processing information from numerous local and remote data resources to assist in solving incredibly complex problems. Such equipment has very stringent power and signal requirements, and must quickly and efficiently interface with related equipment at both adjacent and remote locations. Work areas with readily controllable lighting, HVAC, sound masking, and other physical support systems, are also highly desirable to maximize worker creativity and productivity. Many other types of high technology equipment and facilities are also presently being developed which will find their place in the workplaces of the future.

One important consequence of the advent of sophisticated electronic offices is the increased need and desirability for distributing utilities throughout the various offices in a manner which can be readily reconfigured. The term "utilities" as used herein incorporates a wide variety of facilities for use at a workstation, including security devices, electrical power, signal and/or communications, HVAC, water and other fluids, and other similar resources. The ability to provide the worker with ready access to all of these utilities is clearly advantageous in the quest to promote worker well being and effectiveness.

The efficient use of building floor space is also an ever growing concern, particularly as building costs continue to escalate. Open office plans have been developed to reduce overall officing costs, and generally incorporate large, open floor spaces in buildings that are equipped with modular furniture systems which are readily reconfigurable to accommodate the ever changing needs of a specific user, as well as the divergent requirements of different tenants. One arrangement commonly used for furnishing open plans includes movable partition panels that are detachably interconnected to partition off the open spaces into individual workstations and/or offices. Such partition panels are configured to receive hang-on furniture units, such as worksurfaces, overhead cabinets, shelves, etc., and are generally known in the office furniture industry as "systems furniture". Another arrangement for dividing and/or partitioning open plans includes modular furniture arrangements, in which a plurality of differently shaped, freestanding furniture units are positioned in a side-by-side relationship, with upstanding privacy screens attached to at least some of the furniture units to create individual, distinct workstations and/or offices. Both of these types of modular furniture systems, as well as others, have been widely received due largely to their ability to be readily reconfigured and/or moved to a new site, since they are not part of a permanent leasehold improvement.

In order to gain increased efficiency in the use of expensive office real estate, attempts are now being made to try to support high paid knowledge workers with these types of modular furniture systems in open office settings, instead of conventional private offices. However, in order to insure peak efficiency of such knowledge workers, the workstations must be equipped with the various state-of-the-art utilities and facilities discussed above. Since such workstations must be readily reconfigurable to effectively meet the ever changing needs of the user, the distribution and control of utilities throughout a comprehensive open office plan has emerged as a major challenge to the office furniture industry.

At present, some types of modular furniture systems, such as selected portable partition panels and freestanding furniture units can be equipped with an optional powerway, which extends along the entire width of the unit, and has quick-disconnect connectors adjacent opposite ends thereof to connect with adjacent, like powerways, and thereby provide electrical power to an associated furniture group or cluster. Outlet receptacles are provided along each powerway into which electrical appliances can be plugged. Cable troughs or channels are also provided in most such furniture units, so as to form a system of interconnected raceways into which signal and communications wires can be routed. Such cabling is normally routed through the furniture system after the furniture units are installed, and is then hard wired at each of the desired outlets. While this type of distribution system has proven somewhat effective, the types of utilities provided are rather limited, and their distribution is not wholly modular, thereby resulting in higher installation and reconfiguration costs. The inherent nature of modular furniture systems, which permits them to be readily reconfigured into different arrangements, makes it very difficult to achieve adequate utility distribution.

Various difficulties may be encountered when routing utility lines through known systems. For example, if the utility lines are routed along the upper edge of the partition panel, the utilities will need to change height at each location wherein adjacent partition panels of different heights are utilized. Various end caps and transitions have been developed. However, such arrangements generally add to the complexity and/or cost of the system. Furthermore, difficulty may be encountered when routing a large volume of wires through such a change of height location.

SUMMARY OF THE INVENTION

One aspect of the present invention is to provide an elevated raceway for routing utility lines in a vertically spaced relationship above the upper edge of a partition. The raceway includes an elongated passageway configured to retain utility lines in a horizontally extending manner. A first support member extends downwardly from the raceway, and has a connector spaced apart from the raceway a first vertical distance. The connector is configured to attach to a partition frame. A second support member extends downwardly from the raceway, and has a connector spaced apart from the raceway a second vertical distance that is different from the first vertical distance, such that the raceway is supported at a generally uniform vertical height above an upper edge of a partition having sections with different heights.

Another aspect of the present invention is a partition including a partition frame having a horizontally extending upper frame defining an upper edge of the partition frame. The partition frame further includes a pair of horizontally spaced apart vertical frame members, each having an upper end thereof secured to the upper frame member. The partition frame has a lower portion configured to abuttingly support the partition frame freestanding on a floor surface. The partition further includes a horizontally extending raceway defining an elongated passageway configured to retain utility lines in a horizontally extending manner. A vertically extending support member is connected to the partition frame, and supports the raceway vertically spaced above the upper frame member.

Yet another aspect of the present invention is a partition system including a first partition frame having a first side edge and including a lower portion configured to abuttingly support the first partition frame section freestanding on a floor surface. The first partition frame has a horizontal upper edge. The partition system also includes a second partition frame having a second side edge connected to the first side edge. The second partition frame also includes a lower portion configured to abuttingly support the second partition frame freestanding on a floor surface. The second partition frame has a horizontal upper edge. The first and second partition frames have different heights such that the upper edges are positioned at different elevations when the first and second partition frames are positioned on a floor surface. An elongated elevated duct or raceway is configured to support horizontally extending utility lines. The raceway includes a support member connected to the partition frame and supporting the raceway vertically spaced above the upper edges of the first and second partition frames.

Yet another aspect of the present invention is a partition panel including a generally rectangular partition frame having a base configured to support the partition frame freestanding on a floor surface. The partition frame has a horizontal upper edge. The partition panel also includes a pair of vertical extension members, each having a vertically elongated opening therethrough. A sheet extends upwardly above the upper edge of the partition frame, and is disposed within the vertically elongated openings to retain the sheet in a vertically extending configuration.

These and other features, advantages, and objects of the present invention will be further understood and appreciated by those skilled in the art by reference to the following specification, claims, and appended drawings.

BRIEF DESCRIPTION OF THE DRAWINGS

FIG. 1;

FIG. 1;

DETAILED DESCRIPTION OF PREFERRED EMBODIMENTS

Figure 1:
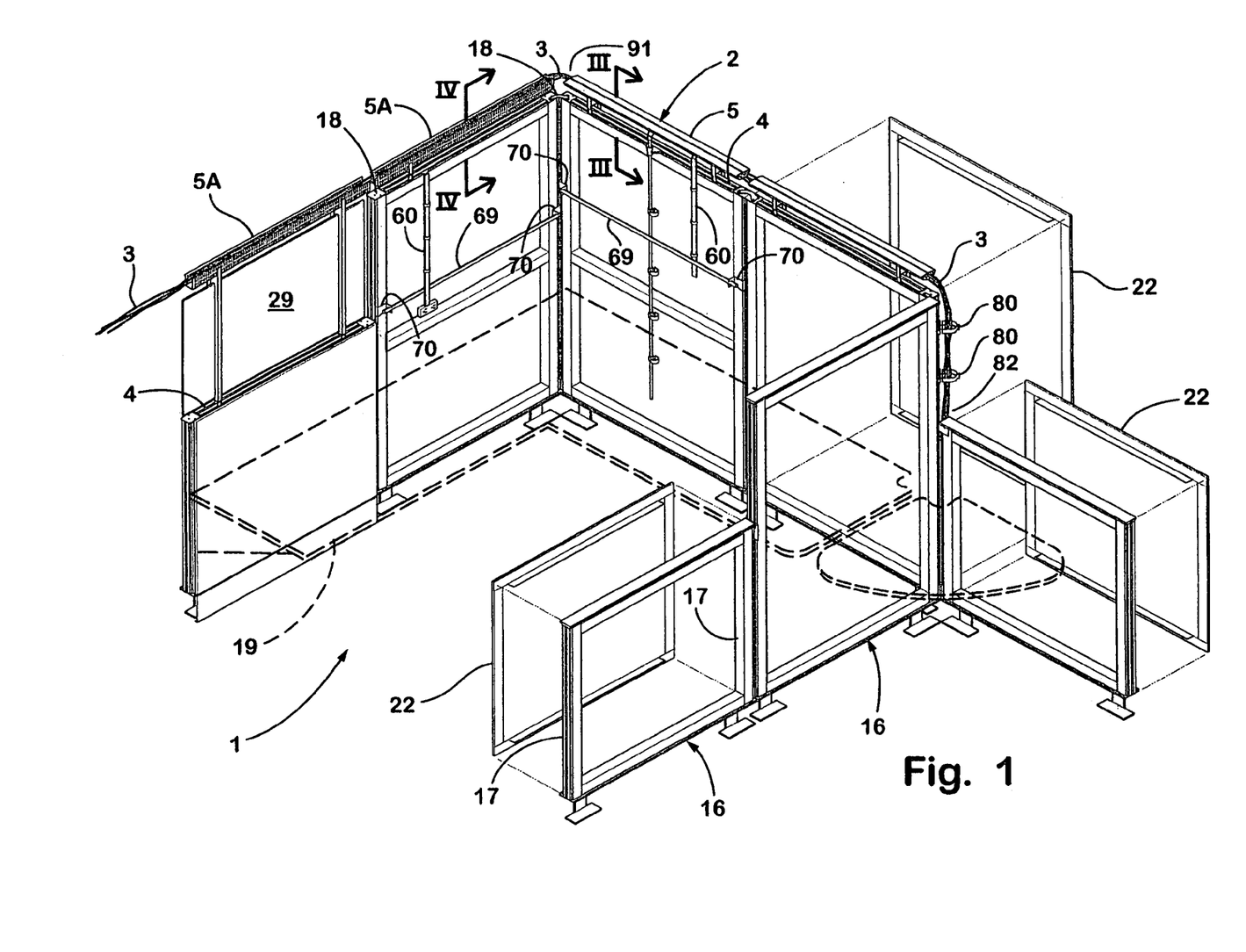
FIG. 1 is a partially exploded, perspective view showing a partition system including an elevated raceway according to the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
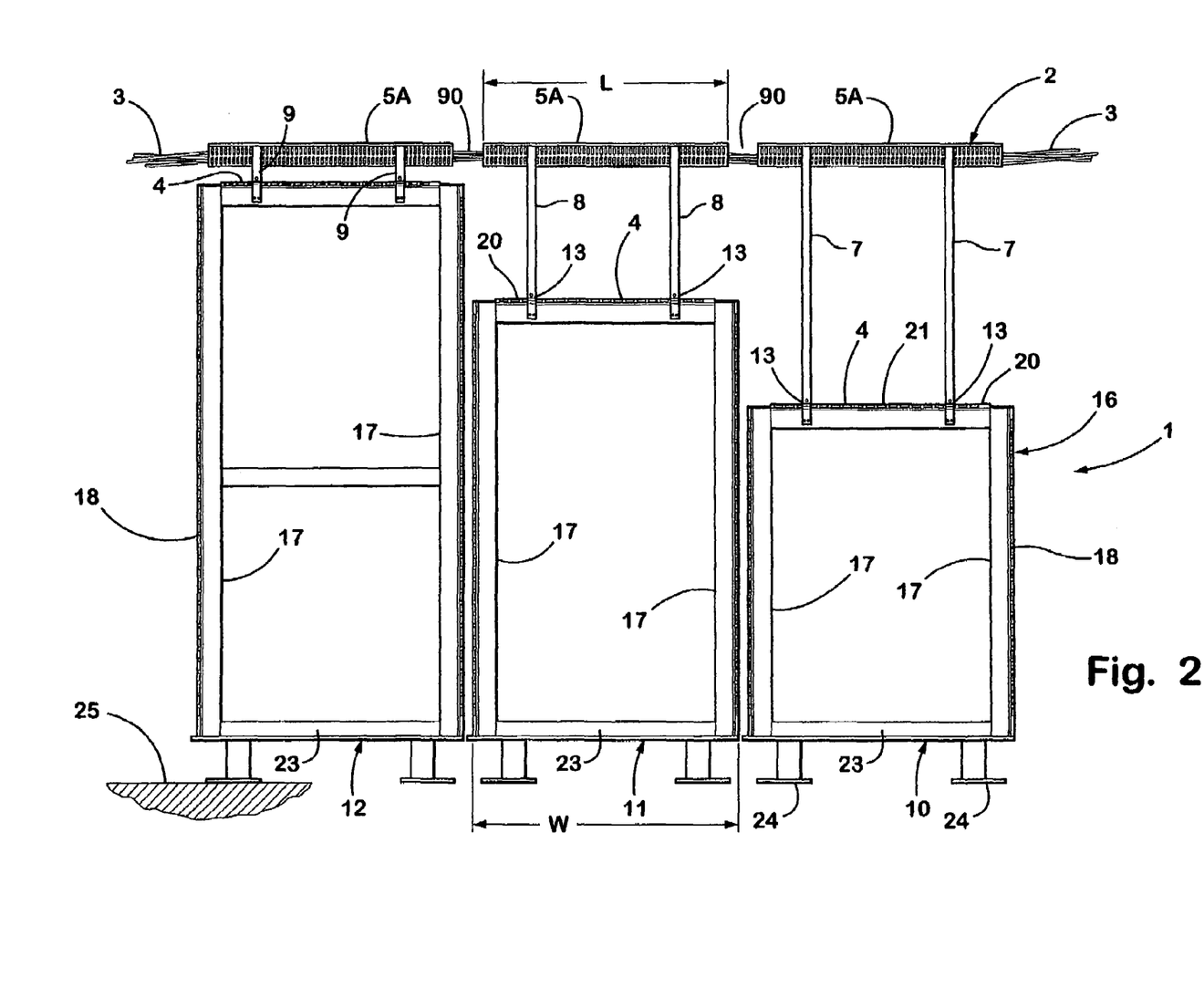
FIG. 2 is a front elevational view of a partition system including partitions of varying size, each of which incorporates an elevated raceway.

FIG. 1 illustrates a partition system 1 including an elevated raceway assembly 2 according to the present invention. The elevated raceway assembly 2 routes utility lines 3 such as power or communications ("data") lines in a vertically spaced relationship above an upper edge 4 of the partition 1. The elevated raceway assembly 2 includes a raceway 5 defining an elongated passageway (see also FIG. 3) configured to retain utility lines 3 in a horizontally extending manner. Although the raceway 5 is presently utilized to route data lines such as telephone lines, the term "raceway" as used herein incorporates an arrangement capable of routing a wide range of utilities, and is not limited to power and/or data lines. The raceway 5 is an extruded polymer material. A second embodiment 5A (FIG. 4) of the raceway is roll formed from steel, and has an upwardly opening U-shape and cross section. With further reference to FIG. 2, partition system 1 may include a first partition panel 10 having a first height, a second partition panel 11 having a second height, and a third partition panel 12 having a third height. A first support member 7 extends downwardly from the raceway 5 or 5A, and has a connector such as a bracket 13 spaced apart from the raceway 5 or 5A a first vertical distance. As described in more detail below, the bracket 13 is configured to attach to a partition panel frame 16. A second support member 8 extends downwardly from the raceway 5 or 5A, and has a connector such as bracket 13 spaced apart from the raceway 5 or 5A a second vertical distance that is different from the first vertical distance such that the raceway 5 or 5A is supported at a generally uniform vertical height spaced above the upper edges 4 of the partitions 10 and 11 having different heights.

The present application is related to the following, the entire contents of each of which are hereby incorporated herein by reference.

| Appln. No. | Filing Date | Title | U.S. Pat. No. | Issue Date |
|---|---|---|---|---|
| 09/692,786 | Oct. 20, 2000 | PARTITION PANEL | 6,481,163 | Nov. 19, 2002 |
| 09/693,225 | Oct. 20, 2000 | PARTITION PANEL WITH INFILL ARRANGEMENT | 6,533,019 | Mar. 18, 2003 |
| 09/693,316 | Oct. 20, 2000 | PARTITION SYSTEM WITH WORKTOOLS | 6,625,935 | Sep. 30, 2003 |
| 09/692,796 | Oct. 20, 2000 | TOP CAP AND SCREEN FOR PARTITIONS | Abandoned | |

Figure 3:
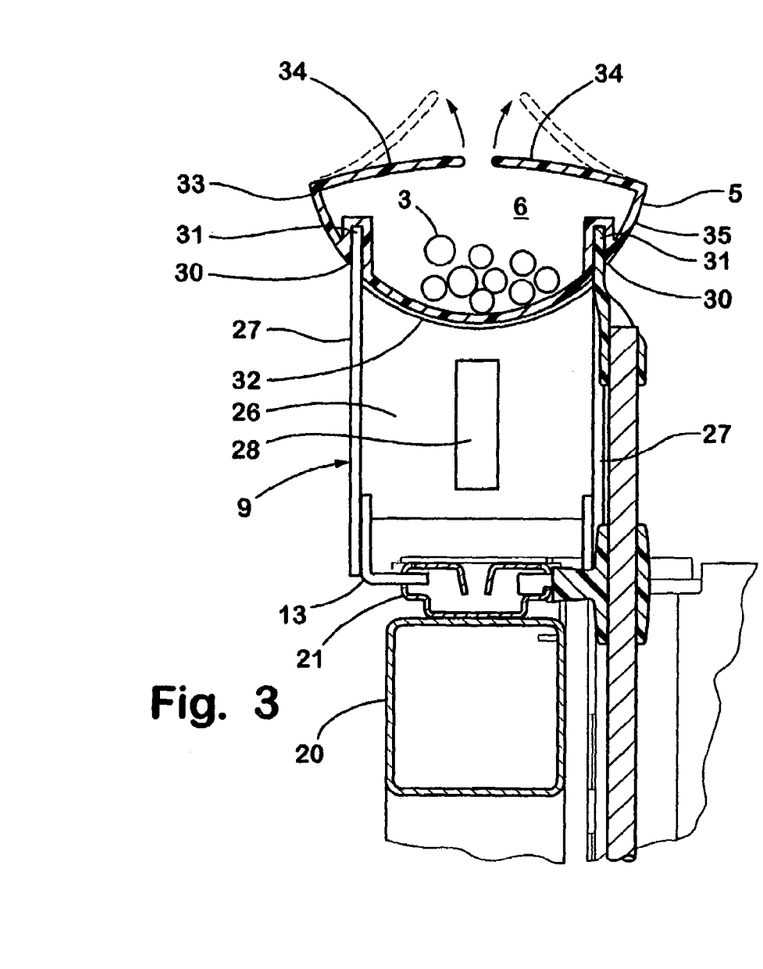
FIG. 3 is a cross-sectional view of the raceway taken along the line III—III.

With reference to FIG. 3, each of the support members 7, 8, and 9 have substantially the same cross-sectional shape, but vary in height. The support member 9 includes a central web 26, and a pair of side webs 27, thus forming an I-beam type cross sectional shape. As described in more detail below, a vertically elongated opening 28 through the central web 26 of support members 7 and 8 may receive a sheet 29 (FIG. 9) forming an extension screen. Support 9 does not include an opening 28, but otherwise has the same cross sectional shape as supports 7 and 8. The raceway member 5 includes a pair of downwardly opening grooves 30 that receive the upper ends 31 of side webs 27 to secure the raceway 5 on the support 9. The upper edge 32 of central web 26 has an arcuate shape that closely matches the arcuate lower surface 33 of the raceway 5. Raceway 5 includes a pair of flexible flaps 34 that can be rotated upwardly to permit insertion of the utility lines 3 into the elongated cavity 6. Raceway member 5 is preferably a dual durometer polymer, wherein the lower U-shaped portion 35 is made of a relatively rigid material, and the flaps 34 are made of a relatively flexible material.

Figure 4:
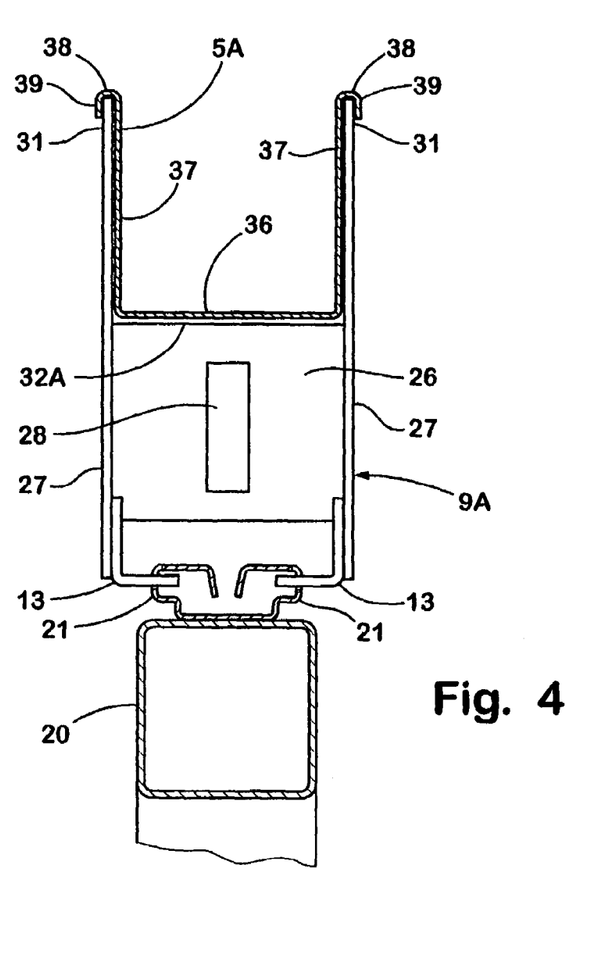
FIG. 4 is a cross-sectional view of a second embodiment of the raceway taken along the line IV—IV.

With further reference to FIG. 4, the second embodiment 5A of the wireway is made from roll formed steel, and includes a lower or base web 36, and a pair of side webs 37 that extend therefrom to form an upwardly opening U-shape cross section. The upper ends 38 of side webs 37 terminate in small U-shaped flanges 39 that receive the upper ends 31 of the side webs 27. The support member 9A is substantially the same as the first embodiment 9 of the support, except that the upper edge 32A is straight, rather than curved, to fit closely against the lower web 36 of the raceway 5A. As discussed in more detail below, the supports 9 and 9A are both connected to the horizontal row of slots 21 in horizontal frame member 20 by a bracket 13.

Figure 5:
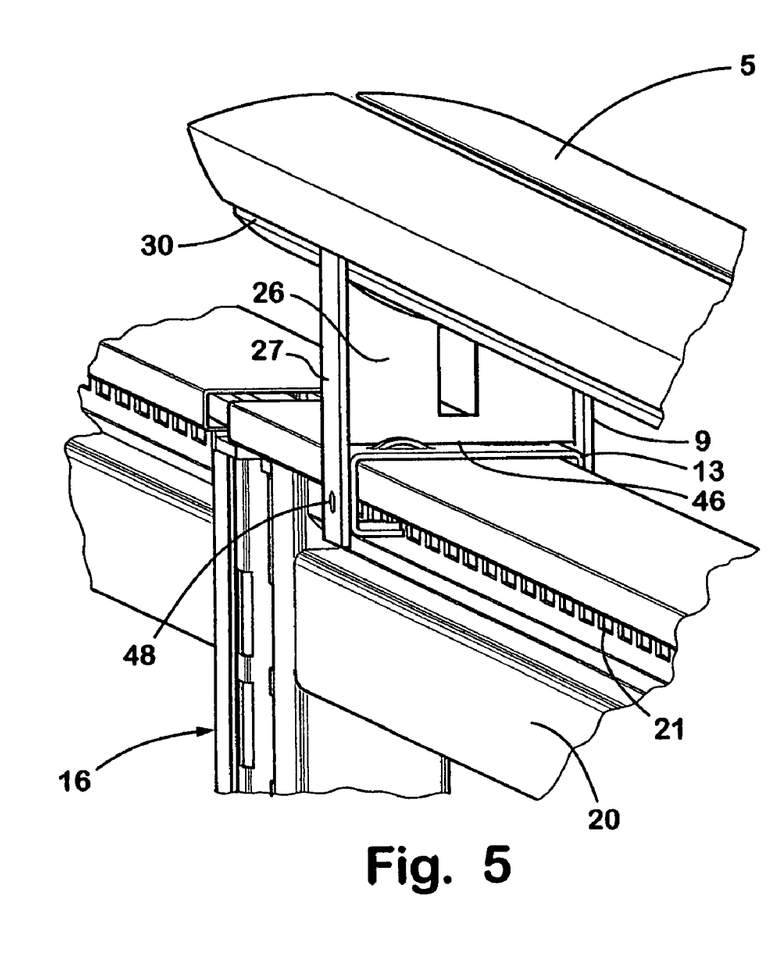
FIG. 5 is a fragmentary, perspective view showing a first embodiment of a bracket for connecting the raceway to the horizontal row of slots of the partition of FIG. 1.
Figure 6:
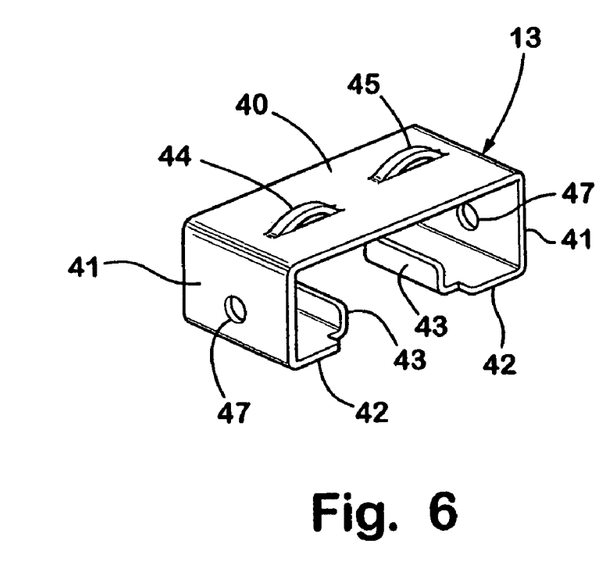
FIG. 6 is a perspective view of the bracket of FIG. 5.

The overall length "L" (FIG. 2) of the raceway segments is less than the overall width "W" of the partition panels, thereby creating a gap 90 between adjacent raceways segments. Because the gap 90 is relatively small, the utility lines 3 may be routed across the gaps 90. Furthermore, the gap 90 eliminates the need for special corner connectors and the like at a corner 91 (FIG. 1) between raceway segments oriented at 90 degrees or other non-linear plan configurations. With further reference to FIGS. 5 and 6, a first embodiment of bracket 13 includes a upper web 40, side webs 41, and inwardly extending lower webs 42 that terminate in upwardly extending flanges 43. When installed, the flanges 43 and a portion of the lower webs 42 are received within the openings 21 in the horizontal frame member 20. The support member 9 is then installed on the bracket 13, with the lower edge 46 of web 26 received between first and second upper protrusions 44 and 45 on upper web 40 of bracket 13. Openings 47 in side webs 41 of bracket 13, and openings 48 in side web 27 of extension 9 receive a conventional threaded fastener or other connector to secure the extension 9 to the bracket 13. The bracket 13 may also be utilized with a support member 9A when a raceway 5A is utilized.

Figures 7, 8:
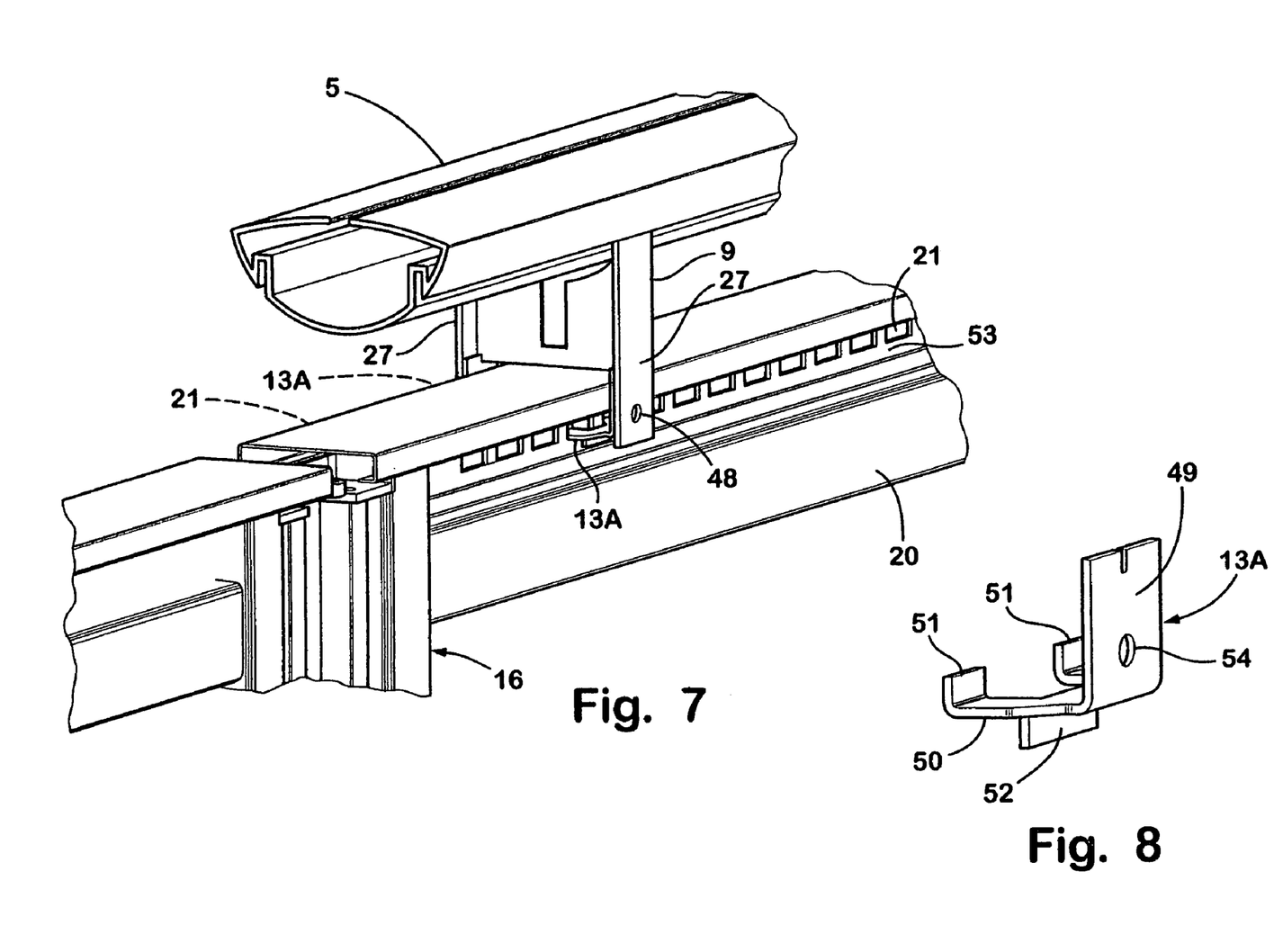
FIG. 7 is a fragmentary, perspective view of a second embodiment of a bracket for connecting the raceway to the horizontal row of slots of the partition of FIG. 1.
FIG. 8 is a perspective view of the bracket of FIG. 7.

With further reference to FIGS. 7 and 8, a second embodiment 13A of the bracket includes a side web 49, a base web 50, a pair of spaced apart upwardly extending tabs 51, and a downwardly extending central tab 52. When installed, the tabs 51 extend into the openings 21, and the downwardly extending tab 51 fits closely against the side surface 53 of horizontal frame member 20. An opening 54 receives a fastener to secure the bracket 13A to the opening 48 through the side web 27 of support member 9. A bracket 13A is connected to each of the side webs 27 of the support 9, such that the support 9 engages the openings 21 on each side of the upper horizontal frame member 20. Either of the embodiments 13 or 13A of the bracket may be utilized with either embodiment of the supports 9 or 9A, or with the supports 7 and 8 of different lengths. Furthermore, it should be understood that the supports 7, 8, and 9 of various lengths may comprise either the first embodiment utilized to support the raceway 5 of FIG. 3, or the second embodiment of the support utilized to support the second embodiment of the raceway 5A illustrated in FIG. 4.

Figure 9:
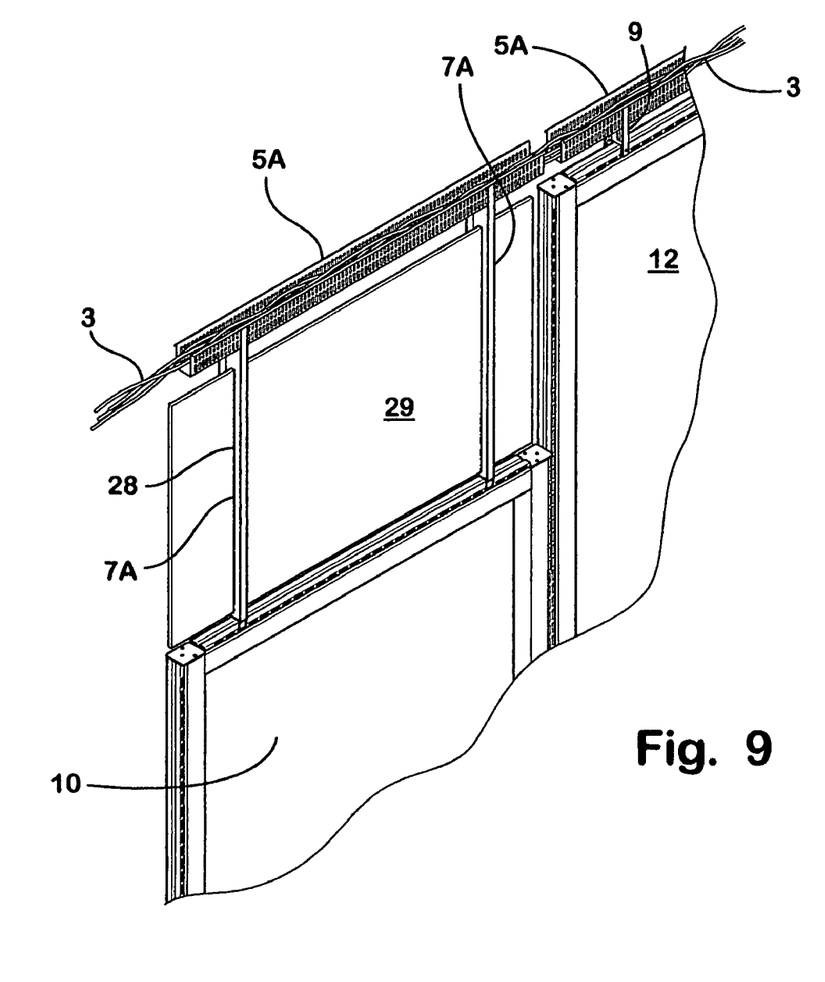
FIG. 9 is a fragmentary, perspective view illustrating the elevated raceway of FIG. 1, including a privacy screen extension.

With further reference to FIG. 9, a sheet 29 may be disposed in the elongated vertical slots 28 of the support members, thus providing an additional degree of privacy if required for a particular application. The sheet 29 may comprise a translucent or frosted polymer material, or may comprise an opaque material as required to provide the desired degree of privacy. The sheet 29 could be made of virtually any material having the desired characteristics for a given user. Sheet 29 is installed by sliding the sheet 29 into slots 28.

Figure 10:
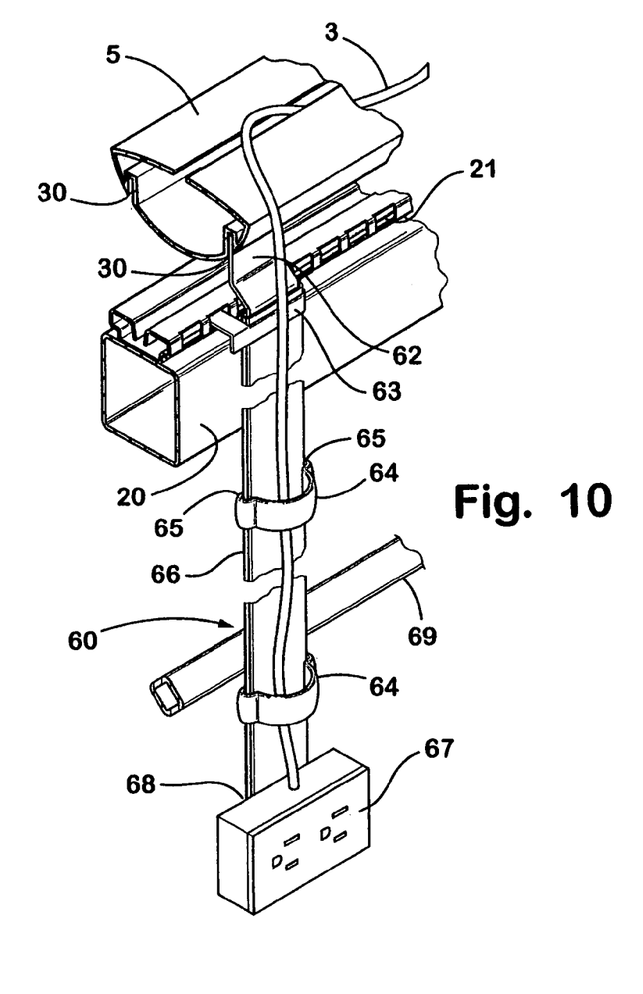
FIG. 10 is a fragmentary, perspective view illustrating a utility conduit for routing utility lines from the elevated raceway to a lower height.

With further reference to FIG. 10, a utility conduit assembly 60 may be utilized to route utility lines downwardly from the raceway 5 to the height of a worksurface 19 (see also FIG. 1), or other convenient height within the workspace. An elongated member 61 includes an upper end 62 that is received within the groove or slot 30 in the raceway 5, and a hooked bracket 63 secures the elongated member 61 to the row of openings 21 in the horizontal frame member 20. A plurality of retainers 64 have a C-shape, with a pair of opposed grooves 65 that receive the opposite edges 66 of the elongated member 61 to retain the retainer clips 64. In the illustrated example, the elongated member 61 is made of steel, and the retainer clips 64 are made of a flexible polymer material to permit the clips 64 to be flexed open for connection to the elongated member 61. A receptacle 67 for receiving power or communications plugs is secured to the lower end 68 of the elongated member 61. The utility conduit 60 may be of varying lengths to permit routing of utility lines to a desired height. As discussed in detail in the above-identified patent application entitled PARTITION SYSTEM WITH WORKTOOLS, an optional horizontal cross brace 69 includes a pair of hooked brackets that engage the vertical rows of openings 18 to support the horizontal brace 69. If a brace 69 is utilized, the elongated member 61 abuts the horizontal brace 69 to prevent rotation of the utility conduit 60, particularly in applications wherein the frames 16 are not covered by cover panels 22 (see also FIG. 1). Although, bracket 63 and upper end 62 provide sufficient strength to permit use of utility conduit 60 without brace 69, it is anticipated that brace 69 could be utilized if required for certain applications. The cover panels 22 are substantially the same as the existing Steelcase AVENIR cover panels, and will therefor not be described in detail herein. The elongated member 61 may include a downwardly opening J-shaped hook (not shown) that engages the upper ends 38 (FIG. 4) of the second embodiment 5A of the utility trough.

Figure 11:
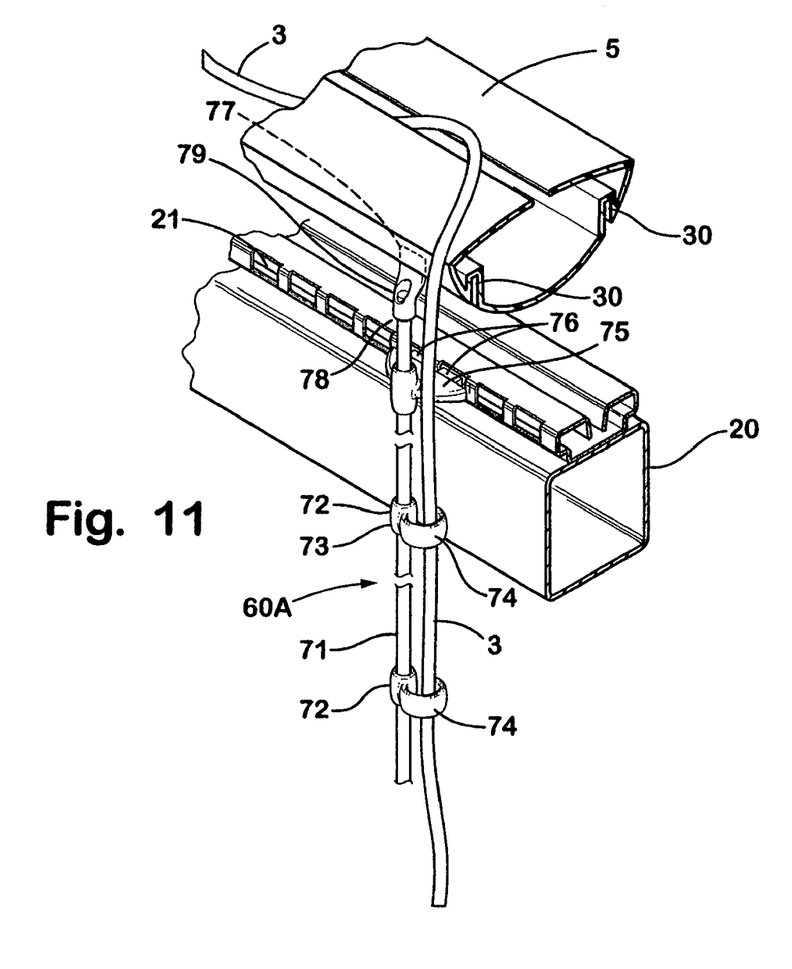
FIG. 11 is a fragmentary, perspective view illustrating a second embodiment of a utility conduit for routing utility lines from the elevated raceway to a lower level.

With further reference to FIG. 11, a second embodiment 60A of the utility conduit includes an elongated rod 71, and a plurality of clips 72 that retain and route the utility lines 3. Clips 72 include a base 73 that slides or clips onto the elongated rod 71. A C-shaped extension 74 extends outwardly from the base 73, forming a hook like structure that permits insertion of the utility lines 3. A bracket 75 includes a plurality of extensions 76 that fit tightly into the horizontal row of openings 21 to support the elongated rod 71. A fitting 77 at the upper end 78 of the rod 71 includes a flat end portion 79 that is received in the grooves 30 of the raceway 5 to retain the rod 71. The second embodiment 60A of the utility conduit may also be supported by a horizontal brace 69 (FIG. 1).

Figure 12:
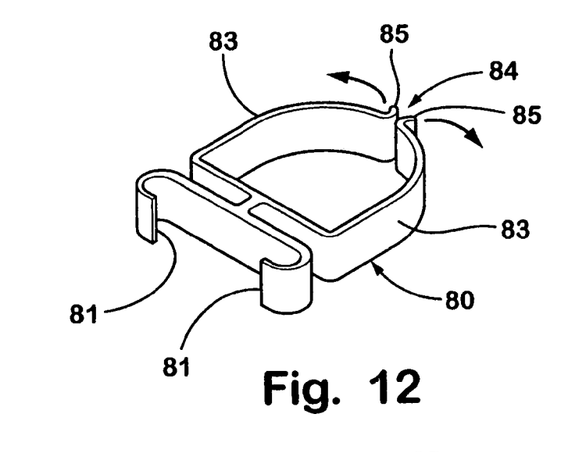
FIG. 12 is a perspective view of a first type of clip utilized to route utility lines along the vertical frame members of the partition of FIG. 1.
Figure 13:
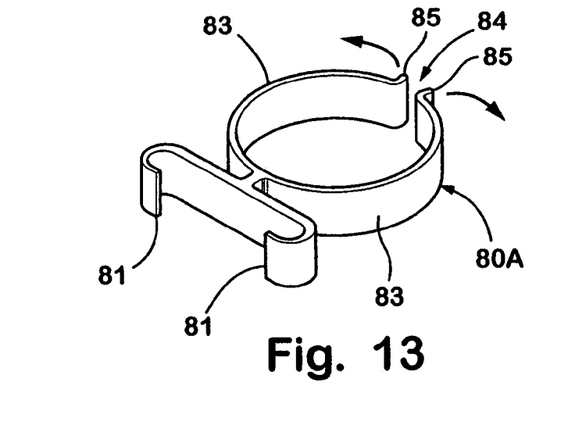
FIG. 13 is a perspective view of a second embodiment of the clip of FIG. 11.

With reference to FIG. 12, a polymer clip 80 includes a pair of extensions 81 that extend inwardly towards one another. The extensions 81 are received within the vertical row of openings 18 along a side edge 82 (see also FIG. 1) of a partition frame 60. The legs 83 of clip 80 may be flexed outwardly to increase the gap 84 at the ends 85 of legs 83 to permit insertion of the utility lines 3. The clip 80 permits external routing of the utility lines 3 on the partition panel frames 16, without requiring a vertical cover or the like. A second embodiment 80A (FIG. 13) of the clip is substantially identical to the first embodiment 80, except that the legs 83 have an arcuate shape. A second embodiment 80A of the clip is otherwise substantially the same as the first embodiment 80.

The elevated raceway 2 of the present invention permits routing of utility lines 3 at a constant height, despite changes in the height of the panel below the raceway. The utility conduits permit routing of utility lines downwardly from the elevated raceway, and the horizontal brace 69 supports the utility conduits 60 or 60A in applications wherein the frame is not covered by cover panels 22. The openings 28 in the raceway support members 8–10 permit insertion of an extension screen 29 to provide an increased level of privacy if required for a particular application.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A partition including first and second partition frames and a raceway arrangement for routing utility lines in a vertically spaced relationship above an upper edge of the partition, said raceway arrangement comprising:

an elevated raceway defining an elongated passageway configured to retain utility lines in a horizontally extending manner;

a first support member extending downwardly from said elevated raceway and having a first connector spaced apart from said elevated raceway a first vertical distance, said first connector attached to said first partition frame proximate a first portion of the upper edge having a first height;

a second support member extending downwardly from said raceway and having a second connector spaced apart from said raceway a second vertical distance that is different from said first vertical distance said second connector attached to said second partition frame proximate a second portion of the upper edge having a second height that is different from said first height, such that said raceway is supported at a generally uniform vertical height spaced above said upper edge of said partition having portions with different heights.

2. The partition set forth in claim 1, wherein:
said raceway has an upwardly opening U-shape to permit lay-in of utility lines.

3. The partition set forth in claim 1, wherein:
said raceway includes a U-shaped channel and a flexible flap closing off said U-shaped channel.

4. The partition set forth in claim 1, wherein:
said raceway includes a U-shaped channel and a pair of flexible flaps cantilevered towards one another and closing off said U-shaped channel.

5. The partition set forth in claim 1, wherein:
said raceway includes a first section having a pair of support members, each having a connector spaced apart from said raceway at said first distance; and
said raceway including a second section having a pair of support members, each having a connector spaced apart from said raceway at said second distance.

6. The partition set forth in claim 1, wherein:
said raceway includes a pair of downwardly opening grooves extending along a lower side of said raceway, said first and second support members including a pair of extensions received in said grooves.

7. A partition, comprising:
a partition frame having a horizontally extending upper frame member defining an upper edge of said partition frame, said partition frame further including a pair of horizontally spaced apart vertical frame members, each having an upper end thereof secured to said upper frame member, said partition frame having a lower portion configured to abuttingly support said partition frame freestanding on a floor surface;
a horizontally extending raceway defining an elongated passageway configured to retain utility lines in a horizontally extending manner, the raceway having an elongated upper opening along a top side of the raceway providing access to the elongated passageway and permitting lay-in of utility lines into the passageway;
a first vertically extending support member including a connector connected to said partition frame, a second vertically extending support member connected to said partition frame, said first and second support members supporting said raceway vertically spaced above said upper frame member; and wherein said raceway has a cross section including a U-shaped portion and a pair of flexible flaps extending over and substantially closing off said U-shaped portion.

8. A partition, comprising:
a partition frame having a horizontally extending upper frame member defining an upper edge of said partition frame, said partition frame further including a pair of horizontally spaced apart vertical frame members, each having an upper end thereof secured to said upper frame member, said partition frame having a lower portion configured to abuttingly support said partition frame freestanding on a floor surface;

a horizontally extending raceway defining an elongated passageway configured to retain utility lines in a horizontally extending manner;

vertically extending first and second support members, each including a connector connected to said partition frame, said first and second support members supporting said raceway vertically spaced above said upper frame member;

said first and second vertically extending support members each including a vertically elongated opening therethrough; and a sheet extending vertically above said upper frame member, said sheet disposed within said vertically elongated openings of said vertically extending first and second members.

9. A partition, comprising:

a partition frame having a horizontally extending upper frame member defining an upper edge of said partition frame, said partition frame further including a pair of horizontally spaced apart vertical frame members, each having an upper end thereof secured to said upper frame member, said partition frame having a lower portion configured to abuttingly support said partition frame freestanding on a floor surface;

a horizontally extending raceway defining an elongated passageway configured to retain utility lines in a horizontally extending manner, said raceway including a pair of grooves extending along a lower side thereof;

first and second vertically extending support members, each including a connector connected to said partition frame, said first and second support members, each supporting said raceway vertically spaced above said upper frame member said first and second vertically extending support members including a pair of extensions received in said grooves.

10. A freestanding partition system, comprising:

a first partition frame having a first side edge and including a lower portion configured to abuttingly support said first partition frame freestanding on a floor surface, said first partition frame having a horizontal upper edge;

a second partition frame having a second side edge connected to said first side edge and a lower portion configured to abuttingly support said second partition frame freestanding on a floor surface, said second partition frame having a horizontal upper edge;

said first and second partition frames having different heights such that said upper edges are positioned at different elevations when said first and second partition frames are positioned at substantially the same height on a generally flat floor surface; and an elongated horizontal elevated raceway configured to support horizontally extending utility lines at a generally uniform elevation, said raceway including a support member connected to said a selected one of said first and second partition frames and supporting said raceway vertically spaced above said upper edges of said first and second partition frames at a generally uniform elevation when said first and second partition frames are positioned on a generally flat floor surface.

11. The partition set forth in claim 10, wherein:

said raceway is generally parallel to said horizontal upper edges of said first and second partition frames.

12. The partition set forth in claim 11, wherein:

said raceway has a cross sectional shape with a U-shaped portion to permit lay-in of utility lines.

13. The partition set forth in claim 12, wherein:

said raceway includes a pair of generally horizontal flexible flaps closing off said U-shaped portion.

14. The partition set forth in claim 10, wherein:

said first and second partition frames each include a horizontal row of openings adjacent said upper edges;

said support member including an extension engaging at least a selected one of said openings to connect said support member to a selected one of said first and second partition frames.

15. The partition set forth in claim 10, including:

a vertical utility conduit connected to said raceway and extending downwardly therefrom to a level below at least a selected one of said horizontal upper edges.

16. The partition set forth in claim 15, including:

a plurality of L-shaped clips to retain utility lines, each clip connected to said utility conduit and extending therefrom in a cantilevered manner.

17. The partition set forth in claim 16, wherein:

said vertical utility conduit includes a receptacle at a lower end thereof.

18. The partition set forth in claim 15, wherein:

said raceway includes at least one groove on a lower side thereof;

said utility conduit having an extension received in said groove.

19. The partition set forth in claim 15, wherein:

said utility conduit includes spaced side edges; and including:

a clip having L-shape and a pair of opposed grooves that receive said side edges to retain said clip on said utility conduit and retain utility lines along said utility conduit.

20. A partition system, comprising:

a first partition frame having a first side edge and including a lower portion configured to abuttingly support said first partition frame section freestanding on a floor surface, said first partition frame having a horizontal upper edge;

a second partition frame having a second side edge connected to said first side edge and a lower portion configured to abuttingly support said second partition frame freestanding on a floor surface, said second partition frame having a horizontal upper edge;

said first and second partition frames having different heights such that said upper edges are positioned at different elevations when said first and second partition frames are positioned on a floor surface;

an elongated horizontal elevated raceway configured to support horizontally extending utility lines, said raceway including a support member connected to said a selected one of said first and second partition frames and supporting said raceway vertically spaced above said upper edges of said first and second partition frames;

said first and second partition frames each include side edges defining first and second panel widths, said raceway including a first section having a length that is less than said first panel width, said raceway further including a second section having a length that is less than said second panel width such that said first and second sections of said raceway are spaced apart to form a gap therebetween.

21. The partition set forth in claim 20, wherein:

said first and second partition frames are connected together at an angle to form an L-shape in plan view.

22. A partition panel, comprising:

a generally rectangular partition frame having base configured to support said partition frame freestanding on a floor surface, said partition frame having a horizontal upper edge;

a pair of vertical extension members, each having a vertically elongated opening therethrough; and a sheet extending upwardly above said upper edge and disposed within said vertically elongated openings to retain said sheet in a vertically extending configuration.

23. The partition panel set forth in claim 22, including:

a horizontally extending raceway configured to support and route utility lines, said raceway secured to said vertical extension members above said sheet.

24. The partition panel set forth in claim 23, wherein:

said partition frame includes a horizontal row of openings adjacent said horizontal upper edge; and said vertical extension members engaging selected ones of said openings to mount said extension members to said partition frame.

25. The partition panel set forth in claim 23, wherein:

said raceway has a U-shaped cross section to permit lay-in of utility lines.

26. The partition panel set forth in claim 23, wherein:

said raceway has a cross-sectional shape including a U-shaped portion, and a pair of flexible flaps extending over and generally closing off said U-shaped portion.

27. A freestanding partition, comprising:

a partition frame having a horizontally extending upper frame member defining an upper edge of said partition frame, said partition frame further including a pair of horizontally spaced apart vertical frame members, each having an upper end thereof secured to said upper frame member, said partition frame having a lower portion configured to abuttingly support said partition frame freestanding on a floor surface;

a horizontally extending raceway defining an elongated passageway configured to retain utility lines in a horizontally extending manner, the raceway having an elongated upper opening along a top side of the raceway providing access to the elongated passageway and permitting lay-in of utility lines into the passageway; and a vertically extending support member connected to said horizontally extending upper frame member of said partition frame and supporting said raceway on said upper frame member vertically spaced above said upper frame member.

28. The partition set forth in claim 27, wherein:

said vertically extending support member is horizontally spaced from said vertical frame members.

\* \* \* \* \*

UNITED STATES PATENT AND TRADEMARK OFFICE
CERTIFICATE OF CORRECTION

| | |
|---|---|
| PATENT NO. | : 7,210,270 B1 |
| APPLICATION NO. | : 09/692663 |
| DATED | : May 1, 2007 |
| INVENTOR(S) | : King et al. |

It is certified that error appears in the above-identified patent and that said Letters Patent is hereby corrected as shown below:

At column 5, line 12, please insert the following paragraph.

--Each of the partition panels 10, 11, and 12 include a partition panel frame 16 having vertical frame members 17, each of which includes a vertical row of openings 18 for supporting hang-on accessories such as work surfaces 19 (Fig 1) and the like. An upper horizontal frame member 20 has the same cross-sectional shape as the vertical frame members 17, and includes a horizontal row of openings 21 that may be utilized to support the raceways 5 or 5A, as well as various other accessories. A lower horizontal frame member 23 includes a pair of feet or glides 24 to support the partition freestanding on a floor surface 25. The horizontal or base member 23 and glide arrangement is substantially the same as the existing Steelcase AVENIR system, such that these features will not be described in detail herein. Furthermore, the partition frame 16 is described in detail in the above-identified co-pending patent application entitled PARTITION PANEL, such that the frame 16 will also not be described in detail here.--

Signed and Sealed this

Twenty-third Day of February, 2010

David J. Kappos
*Director of the United States Patent and Trademark Office*